United States Patent
Kuwamura et al.

(10) Patent No.: US 10,954,808 B2
(45) Date of Patent: Mar. 23, 2021

(54) SEALING DEVICE AND ROTARY MACHINE

(71) Applicant: MITSUBISHI HITACHI POWER SYSTEMS, LTD., Yokohama (JP)

(72) Inventors: Yoshihiro Kuwamura, Tokyo (JP); Hiroharu Oyama, Kanagawa (JP); Yoshinori Tanaka, Kanagawa (JP); Hideaki Sugishita, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 78 days.

(21) Appl. No.: 15/577,649

(22) PCT Filed: May 23, 2016

(86) PCT No.: PCT/JP2016/065169
§ 371 (c)(1),
(2) Date: Nov. 28, 2017

(87) PCT Pub. No.: WO2016/194677
PCT Pub. Date: Dec. 8, 2016

(65) Prior Publication Data
US 2018/0163557 A1    Jun. 14, 2018

(30) Foreign Application Priority Data
Jun. 3, 2015 (JP) .............................. JP2015-112961

(51) Int. Cl.
*F01D 11/02* (2006.01)
*F01D 11/16* (2006.01)
(Continued)

(52) U.S. Cl.
CPC ............ *F01D 11/025* (2013.01); *F01D 11/02* (2013.01); *F01D 11/08* (2013.01); *F01D 11/16* (2013.01);
(Continued)

(58) Field of Classification Search
CPC ........ F01D 11/02; F01D 11/025; F01D 11/08; F01D 11/16; F01D 11/18; F05D 2240/55; F02C 7/28; F16J 15/4472; F16J 15/445
See application file for complete search history.

(56) References Cited

U.S. PATENT DOCUMENTS 1,857,961 A * 5/1932 Lamb ..................... F16J 15/445
                                                          277/413
6,065,754 A   5/2000 Cromer et al.
(Continued)

FOREIGN PATENT DOCUMENTS

| CA | 2 264 996 | 9/1999 |
| CN | 2191280 | 3/1995 |

(Continued)

OTHER PUBLICATIONS

International Search Report dated Aug. 2, 2016 in International Application No. PCT/JP2016/065169, with English translation.
(Continued)

*Primary Examiner* — Nicholas L Foster
(74) *Attorney, Agent, or Firm* — Wenderoth, Lind & Ponack, L.L.P.

(57) ABSTRACT

A sealing device for suppressing a leakage flow of a fluid via an annular gap between a stationary member and a rotary member of a rotary machine includes: a fixed fin having an annular shape and disposed in the annular gap; and a movable fin having an annular shape and being disposed adjacent to the fixed fin in an axial direction inside the annular gap. The movable fin has a greater thermal expansion coefficient than the fixed fin and is fixed to the fixed fin in a fixing region on a root-end side of the movable fin.

13 Claims, 10 Drawing Sheets

(51) Int. Cl.
*F01D 11/08* (2006.01)
*F16J 15/447* (2006.01)
*F16J 15/44* (2006.01)
*F02C 7/28* (2006.01)
*F16J 15/453* (2006.01)
*F01D 5/22* (2006.01)
*F01D 11/18* (2006.01)

(52) U.S. Cl.
CPC ......... *F16J 15/445* (2013.01); *F16J 15/4472* (2013.01); *F01D 5/225* (2013.01); *F01D 11/18* (2013.01); *F02C 7/28* (2013.01); *F05D 2220/31* (2013.01); *F05D 2240/55* (2013.01); *F16J 15/453* (2013.01)

(56) References Cited

U.S. PATENT DOCUMENTS

| | | | | |
|---|---|---|---|---|
| 7,487,588 | B2* | 2/2009 | Hogg | F16J 15/3292 216/100 |
| 7,578,509 | B2* | 8/2009 | Grondahl | F16J 15/3292 277/303 |
| 8,205,453 | B2 | 6/2012 | Conete | |
| 8,596,973 | B2* | 12/2013 | Grondahl | F01D 11/003 415/231 |
| 8,777,563 | B2 | 7/2014 | Sarawate et al. | |
| 8,858,166 | B2* | 10/2014 | Zheng | F01D 11/001 277/416 |
| 9,145,788 | B2 | 9/2015 | Adaickalasanty | |
| 2004/0150165 | A1* | 8/2004 | Grondahl | F16J 15/3292 277/355 |
| 2007/0261225 | A1* | 11/2007 | Hogg | F16J 15/3292 29/458 |
| 2010/0007093 | A1* | 1/2010 | Grondahl | F16J 15/164 277/500 |
| 2011/0135454 | A1 | 6/2011 | Grondahl | |
| 2013/0058765 | A1* | 3/2013 | Zheng | F01D 11/001 415/173.1 |

FOREIGN PATENT DOCUMENTS

| | | |
|---|---|---|
| CN | 1228505 | 9/1999 |
| CN | 101646842 | 2/2010 |
| CN | 103216277 | 7/2013 |
| CN | 103403300 | 11/2013 |
| CN | 203835467 | 9/2014 |
| EP | 1 544 522 | 6/2005 |
| JP | 60-21502 | 2/1985 |
| JP | 1-75664 | 5/1989 |
| JP | 11-351408 | 12/1999 |
| JP | 2000-97350 | 4/2000 |
| JP | 2006-266454 | 10/2006 |
| JP | 2009-085256 | 4/2009 |
| JP | 2009-235430 | 10/2009 |
| JP | 2010-217218 | 9/2010 |
| JP | 2014-42142 | 3/2014 |

OTHER PUBLICATIONS

International Preliminary Report on Patentability dated Dec. 14, 2017 in International Application No. PCT/JP2016/065169, with English translation.
The Examination Report dated Jul. 24, 2019 in corresponding India Application No. 201717042710.
Office Action dated Jan. 17, 2019 in corresponding Chinese Patent Application No. 201680030433.9 with partial English translation.
Office Action dated Sep. 16, 2019 in corresponding Chinese Patent Application No. 201680030433.9 with partial English translation.
Office Action dated Jun. 10, 2020 in corresponding German Patent Application No. 112016002476.2, with English translation.

* cited by examiner

CIRCUMFERENTIAL DIRECTION

RADIAL DIRECTION

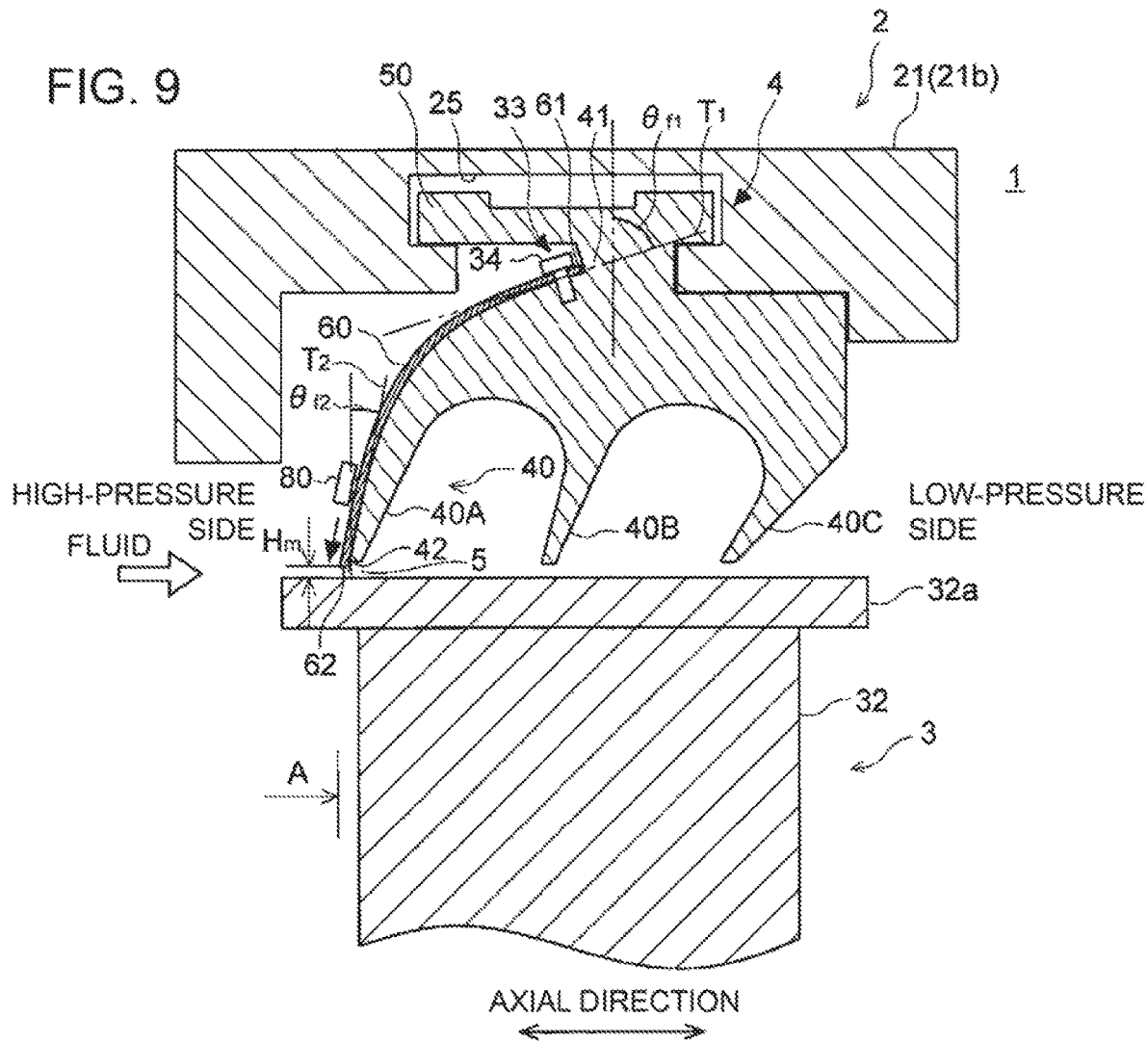

SEALING DEVICE AND ROTARY MACHINE

TECHNICAL FIELD

The present disclosure relates to a sealing device and a rotary machine.

BACKGROUND ART

Typically, a sealing device for suppressing a leakage flow of a fluid via an annular gap between a stationary member and a rotary member of a rotary machine is known.

With regard to such a type of sealing device, it is desirable to reduce the size of the sealing gap during operation of the rotary machine, from the perspective of reduction of a leakage flow. On the other hand, during its startup, the rotary machine temporarily experiences, as a transient state before reaching the normal state, a state in which the sealing gap reaches its minimum (pinch point), due to vibration of the rotational shaft of the rotary machine or an expansion difference between the rotary member and the stationary member. Thus, if the sealing gap in operation of the rotary machine is too small, the sealing device may make contact with the rotary member or the stationary member at the pinch point.

In view of this, proposed is a sealing device capable of adjusting the size of the sealing gap (automatic adjusting seal).

For instance, Patent Document 1 discloses an automatic adjusting seal for rotary machines such as a steam turbine.

The automatic adjusting seal described in Patent Document 1 includes a fixed seal ring and a movable seal ring which are capable of making contact with each other via butting surfaces that comprise horizontal flat surfaces. The movable seal ring is disposed over an angular range of 120 degrees along the outer peripheral surface of the rotor, above and below the rotor of the rotary machine. The fixed seal ring is disposed over an angular range of 60 degrees along the outer peripheral surface of the rotor, on the right and left of the rotor. The movable seal ring is biased by an elastic member in a direction away from the fixed seal ring. During rated operation of the rotary machine, the movable seal ring is pressed against the fixed seal ring by a fluid, such that the sealing gap decreases.

CITATION LIST

Patent Literature

Patent Document 1: JP2000-97350A

SUMMARY

Problems to be Solved

However, the automatic adjusting seal described in Patent Document 1 has an extensive device configuration including a fixed seal ring, a movable seal ring, and an elastic member (biasing member), and thus can be applied only to limited locations.

In view of the above issues, an object of at least one embodiment of the present invention is to provide a sealing device capable of adjusting the sealing gap with a simple device configuration, and a rotary machine having the same.

Solution to the Problems (1) A sealing device for suppressing a leakage flow of a fluid via an annular gap between a stationary member and a rotary member of a rotary machine, according to some embodiments of the present invention, comprises: a fixed fin having an annular shape and disposed in the annular gap; and a movable fin having an annular shape and being disposed adjacent to the fixed fin in an axial direction inside the annular gap. The movable fin has a greater thermal expansion coefficient than the fixed fin and is fixed to the fixed fin in a fixing region on a root-end side of the movable fin.

(2) In an embodiment, in the above configuration (1), the movable fin is fixed to the fixed fin only in the fixing region on the root-end side of the movable fin.

In the above configuration (1) or (2), the movable fin is disposed adjacent to the fixed fin, in the axial direction, inside the annular gap between the stationary member and the rotary member, and also, the fixing region on the root-end side of the movable fin (in the configuration (2), only the fixing region) is fixed to the fixed fin.

Thus, if the sealing device is exposed to a high-temperature fluid while the rotary machine is in operation, the movable fin thermally expands at the tip-end side, starting from the fixing region on the root-end side. At this time, since the movable fin has a greater thermal expansion coefficient than the fixed fin, the thermal expansion amount of the movable fin at its tip-end side is greater than the thermal expansion amount of the fixed fin at its tip-end side. Thus, the clearance $H_m$, between the stationary member or the rotary member of the rotary machine and the tip of the movable fin of the sealing device, is small as compared to that at the time when the rotary machine is stopped, and thus it is possible to suppress a leakage flow of a fluid via the clearance $H_m$.

(3) In some embodiments, in the above configuration (1) or (2), the movable fin includes a plurality of segments arranged in a circumferential direction, and each of the segments has the fixing region in which the segment is fixed to the fixed fin on a tip-end side of the segment.

With the above configuration (3), the movable fin is divided into a plurality of segments in the circumferential direction, and thus each of the segments has a reduced restraining force against thermal expansion deformation, which makes it possible to further reduce the clearance $H_m$ utilizing thermal expansion of each segment of the rotary machine when the rotary machine is in operation. Accordingly, it is possible to suppress a leakage flow of a fluid via the clearance $H_m$ effectively.

(4) In some embodiments, in the above configuration (3), the fixing region is a partial portion of a circumferential-directional range on the root-end side of the segment, and each of the segments of the movable fin is allowed to expand thermally in a radial direction and the circumferential direction starting from the fixing region.

With the above configuration (4), the fixing region of each segment of the movable fin fixed to the fixed fin is a partial portion of the circumferential-directional range of each segment on its root-end side, and thereby each segment is allowed to expand thermally not only in the radial direction but also in the circumferential direction starting from the fixing region. Thus, when the segments thermally expand during startup of the rotary machine, it is possible to further weaken restraint between adjacent segments. Thus, during operation of the rotary machine, it is possible to further reduce the clearance $H_m$ through thermal expansion of each segment of the movable fin. Accordingly, it is possible to suppress a leakage flow of a fluid via the clearance $H_m$ effectively.

(5) In some embodiments, in the above configuration (4), the fixing region is positioned in center, with respect to the circumferential direction, of the circumferential-directional range on the root-end side of the segment.

With the above configuration (5), the fixing region of each segment (region fixed to the fixed fin) is disposed in the center with respect to the circumferential direction of each segment, and thereby the regions on both sides of the fixing region of each segment are not restrained by the fixed fin. Thus, during operation of the rotary machine, each segment of the movable fin is allowed to thermally expand even more flexibly, and it is possible to reduce the clearance $H_m$ even further. Accordingly, it is possible to suppress a leakage flow of a fluid via the clearance $H_m$ even more effectively.

(6) In some embodiments, in any one of the above configurations (3) to (5), the sealing device further comprises a restraining member mounted to the fixed fin at a position closer to the tip-end side of the movable fin than the fixing region, for suppressing separation of each of the segments of the movable fin from the fixed fin.

As described above, the tip-end side of each segment of the movable fin is not fixed to the fixed fin. Thus, there is a risk of a fluid entering the gap between the tip-end side of the movable fin and the tip-end side of the fixed fin, and causing each segment of the movable fin to separate from the fixed fin.

In this regard, with the above configuration (6), the restraining member is mounted to the fixed fin at a position closer to the tip-end side of the movable fin than the fixing region, and thereby it is possible to suppress separation of each segment of the movable fin from the fixed fin.

(7) In some embodiments, in the above configuration (6), the restraining member includes: a supporting rod portion fixed to the fixed fin so as to extend between adjacent two of the segments; and a holding plate portion disposed on a tip of the supporting rod portion, the holding plate portion extending in the circumferential direction from the supporting rod portion so that the segments are at least partially nipped between the fixed fin and the holding plate portion.

With the above configuration (7), by using the restraining member including the supporting rod portion fixed to the fixed fin between adjacent segments and the holding plate portion disposed on the tip of the supporting rod portion, it is possible to suppress separation of each segment from the fixed fin without affecting thermal expansion deformation of each segment substantially.

(8) In some embodiments, in any one of the above configurations (3) to (7), a circumferential-directional gap is formed between adjacent two of the segments, at least when the rotary machine is stopped.

With the above configuration (8), it is possible to further weaken restraint between adjacent segments. Thus, during operation of the rotary machine, it is possible to further reduce the clearance $H_m$ through thermal expansion of each segment of the movable fin. Accordingly, it is possible to suppress a leakage flow of a fluid via the clearance $H_m$ even more effectively.

(9) In some embodiments, in any one of the above configurations (3) to (8), the number of the segments of the movable fin is an even number.

With the above configuration (9), the number of segments of the movable fin is an even number, and thus it is possible to improve the efficiency of the assemble work of the sealing device by providing fixed fins having a halved structure. In this case, assembly of the sealing device is completed by preparing a pair of fixed fins each having a semi-circle shape and having an integer number of segments assembled thereto, and attaching the pair to the rotary machine.

(10) In some embodiments, in any one of the above configurations (1) to (9), a tip thickness of the movable fin is smaller than a tip thickness of the fixed fin.

As described above, the movable fin has a greater thermal expansion coefficient than the fixed fin, and thus the clearance $H_m$ may become excessively narrow due to thermal expansion of the movable fin, transiently during startup of the rotary machine. Thus, there is a risk of contact between the rotary member or the stationary member of the rotary machine and the tip portion of the movable fin.

In this regard, with the above configuration (10), the tip thickness of the movable fin is relatively smaller than that of the fixed fin, and thereby it is possible to suppress heat generation and vibration due to contact, even in case the rotary member or the stationary member of the rotary machine and the tip portion of the movable fin makes contact with each other. Furthermore, with the tip thickness of the fixed fin being relatively greater than that of the movable fin, it is possible to suppress deformation of the tip portion of the fixed fin due to the pressure difference of the fluid at both sides of the movable fin and the fixed fin in the axial direction, and to suppress unexpected displacement of the movable fin that accompanies deformation of the fixed fin.

(11) In some embodiments, in any one of the above configurations (1) to (10), $H_{m1} \geq H_{f1}$ and $H_{m2} < H_{f2}$ are satisfied, provided that, $H_{m1}$ is a clearance formed between the stationary member or the rotary member and the movable fin when the rotary machine is stopped; $H_{f1}$ is a clearance formed between the stationary member or the rotary member and the fixed fin when the rotary machine is stopped; $H_{m2}$ is a clearance formed between the stationary member or the rotary member and the movable fin when the rotary machine is in rated operation; and $H_{f2}$ is a clearance formed between the stationary member or the rotary member and the fixed fin when the rotary machine is in rated operation.

With the above configuration (11), when the rotary machine is stopped, the clearance $H_{m1}$ formed between the stationary member or the rotary member and the movable fin is not smaller than the clearance $H_{f1}$ formed between the stationary member or the rotary member and the fixed fin, and thus it is possible to reduce the risk of contact between the stationary member or the rotary member and the movable fin, at the pinch point that the rotary machine experiences during startup.

Furthermore, during rated operation of the rotary machine, the clearance $H_{m2}$ formed between the stationary member or the rotary member and the movable fin is smaller than the clearance $H_{f2}$ formed between the stationary member or the rotary member and the fixed fin, and thus it is possible to suppress a leakage flow of a fluid via the clearance $H_{m2}$.

(12) In some embodiments, in any one of the above configurations (1) to (11), the movable fin is disposed on a high-pressure side of the fixed fin.

With the above configuration (12), when the rotary machine is in operation, the movable fin is pressed against the fixed fin by a high-pressure fluid, and thus it is possible to suppress separation of the movable fin from the fixed fin.

(13) In some embodiments, in the above configuration (12), the sealing device further comprises a seal ring engaged with a groove formed on the stationary member or the rotary member, the seal ring having, on a tip-end side, a plurality of the fixed fins arranged in the axial direction. The movable fin is disposed at least on the high-pressure side of the fixed fin positioned most upstream with respect to the leakage flow.

With the above configuration (13), for the seal ring having a plurality of stages of fixed fins, the movable fin is mounted to the high-pressure side of the most upstream fixed fin, and thereby it is possible to suppress separation of the movable fin from the fixed fin utilizing the pressure of the fluid, also for the sealing device having a plurality of stages of fixed fins.

If, hypothetically, the movable fin is to be mounted to the high-pressure side of a downstream fixed fin in a sealing device having a plurality of fixed fins, (i.e., if the movable fin is to be mounted between fixed fins disposed next to each other), it is necessary to reduce the size of the movable fin. In this case, the length of the movable fin (distance from the root portion to the tip portion of the movable fin) could be insufficient, and it may be difficult to achieve a sufficient thermal expansion amount of the movable fin. This may limit the effect to suppress a leakage flow from reduction of the clearance $H_m$ utilizing thermal expansion deformation of the movable fin during operation of the rotary machine.

(14) In some embodiments, in the above configuration (12) or (13), a gap is formed between a tip portion of the movable fin and a tip portion of the fixed fin when the rotary machine is stopped.

With the above configuration (14), during operation of the rotary machine, the movable fin disposed on the high-pressure side is pressed against a high-pressure side surface of the fixed fin by a fluid, and thereby the tip portion of the movable fin deforms. Accordingly, by utilizing deformation of the movable fin due to the pressing force of the fluid toward the fixed fin, in addition to thermal expansion deformation of the movable fin, it is possible to control the clearance $H_m$ with a higher flexibility during operation of the rotary machine. Thus, it is possible to suppress a leakage flow of a fluid via the clearance $H_m$ even more appropriately.

(15) In some embodiments, in any one of the above configurations (1) to (14), the fixed fin and the movable fin extend obliquely with respect to a radial direction so that the tip-end side is disposed on the high-pressure side of the root-end side.

With the above configuration (15), the length of the movable fin (distance from the root portion to the tip portion of the movable fin) can be ensured sufficiently, which makes it possible to, during operation of the rotary machine, enjoy an improved effect to suppress a leakage flow from reduction of the clearance $H_m$ utilizing thermal expansion deformation of the movable fin.

(16) In some embodiments, in any one of the above configurations (1) to (15), the sealing device further comprises a seal ring engaged with a groove formed on one of the stationary member or the rotary member, the seal ring having, on a tip-end side, at least one of the fixed fin. The movable fin extends obliquely with respect to a radial direction from a root portion of the movable fin positioned in an axial-directional range of the groove toward a tip portion of the movable fin positioned outside the axial-directional range of the groove.

With the above configuration (16), a seal ring is provided, which is engaged with the groove formed on one of the stationary member or the rotary member, and the movable fin extends obliquely with respect to the radial direction from within the axial-directional range of the groove to outside the axial-directional range. Thus, the length of the movable fin (distance from the root portion to the tip portion of the movable fin) can be ensured sufficiently, which makes it possible to, during operation of the rotary machine, enjoy an improved effect to suppress a leakage flow from reduction of the clearance $H_m$ utilizing thermal expansion deformation of the movable fin.

(17) In some embodiments, in the above configuration (16), the movable fin is positioned so that at least the root portion of the movable fin exists inside the groove.

With the above configuration (17), the root portion of the movable fin is disposed inside the groove and thus it is possible to further increase the length of the movable fin, which makes it possible to, during operation of the rotary machine, enjoy an improved effect to suppress a leakage flow from reduction of the clearance $H_m$ utilizing thermal expansion deformation of the movable fin.

(18) In some embodiments, in any one of the above configurations (1) to (17), the fixed fin and the movable fin are curved in a cross section, taken in the axial direction, of the rotary machine.

With the above configuration (18), the length of the movable fin (distance from the root portion to the tip portion of the movable fin) can be ensured sufficiently, which makes it possible to, during operation of the rotary machine, enjoy an improved effect to suppress a leakage flow from reduction of the clearance $H_m$ utilizing thermal expansion deformation of the movable fin.

(19) In some embodiments, in the above configuration (18), a tangent direction, in the cross section taken in the axial direction, of a surface of the fixed fin which is on a side adjacent to the movable fin satisfies a relational expression $\theta_{f1} > \theta_{f2}$, provided that, $\theta_{f1}$ is an angle formed between the tangent direction and a radial direction at the root-end side of the fixed fin, $\theta_{f2}$ is an angle formed between the tangent direction and the radial direction at a tip-end side of the fixed fin. The movable fin is curved along the fixed fin.

With the above configuration (19), also for the movable fin curved along the fixed fin, the angle formed between the radial direction and the tangent direction of the movable fin is smaller at the tip-end side than at the root-end side. In other words, the movable fin is relatively more conforming to the radial direction at the side of the tip portion than at the root portion. Thus, it is possible to increase the ratio of the amount of change of the clearance $H_m$ to the amount of thermal expansion deformation at the tip-end side of the movable fin, which makes it possible to, during operation of the rotary machine, enjoy an even more improved effect to suppress a leakage flow from reduction of the clearance $H_m$ utilizing thermal expansion deformation of the movable fin.

(20) A sealing device for suppressing a leakage flow of a fluid via an annular gap between a stationary member and a rotary member of a rotary machine, according to some embodiments of the present invention, comprises: a fixed fin having an annular shape and disposed in the annular gap; and a movable fin having an annular shape and being disposed adjacent to the fixed fin in an axial direction inside the annular gap. Furthermore, $H_{m1} \geq H_{f1}$ and $H_{m2} < H_{f2}$ are satisfied, provided that, $H_{m1}$ is a clearance formed between the stationary member or the rotary member and the movable fin when the rotary machine is stopped; $H_{f1}$ is a clearance formed between the stationary member or the rotary member and the fixed fin when the rotary machine is stopped; $H_{m2}$ is a clearance formed between the stationary member or the rotary member and the movable fin when the rotary machine is in rated operation; and $H_{f2}$ is a clearance formed between the stationary member or the rotary member and the fixed fin when the rotary machine is in rated operation.

With the above configuration (20), when the rotary machine is in operation, the clearance $H_{m1}$ formed between the stationary member or the rotary member and the movable fin is not smaller than the clearance $H_{f1}$ formed between the stationary member or the rotary member and the fixed fin, and thus it is possible to reduce the risk of contact between the stationary member or the rotary member and the movable fin, at the pinch point that the rotary machine experiences during startup.

Furthermore, during rated operation of the rotary machine, the clearance $H_{m2}$ formed between the stationary member or the rotary member and the movable fin is smaller than the clearance $H_{f2}$ formed between the stationary member or the rotary member and the fixed fin, and thus it is possible to suppress a leakage flow of a fluid via the clearance $H_{m2}$.

(21) A rotary machine according to some embodiments of the present invention comprises: a stationary member; a rotary member disposed so as to face the stationary member; and the sealing device according to any one of claims 1 to 19 disposed in an annular gap between the stationary member and the rotary member.

With the above configuration (21), the rotary machine 1 includes the sealing device having any one of the above configurations (1) to (20), and thus the clearance $H_m$, between the stationary member or the rotary member and the tip of the movable fin of the sealing device, is smaller when the rotary machine is in operation than when the rotary machine is stopped, and thus it is possible to suppress a leakage flow of a fluid via the clearance $H_m$, and to improve efficiency of the rotary machine.

Advantageous Effects

According to at least one embodiment of the present invention, during operation of the rotary machine, the clearance $H_m$, between the stationary member or the rotary member of the rotary machine and the tip of the movable fin of the sealing device, is small as compared to that at the time when the rotary machine is stopped, and thus it is possible to suppress a leakage flow of a fluid via the clearance $H_m$.

BRIEF DESCRIPTION OF DRAWINGS

FIG. 9 is a cross-sectional view showing tip regions of a fixed fin and a movable fin of a sealing device according to yet another embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
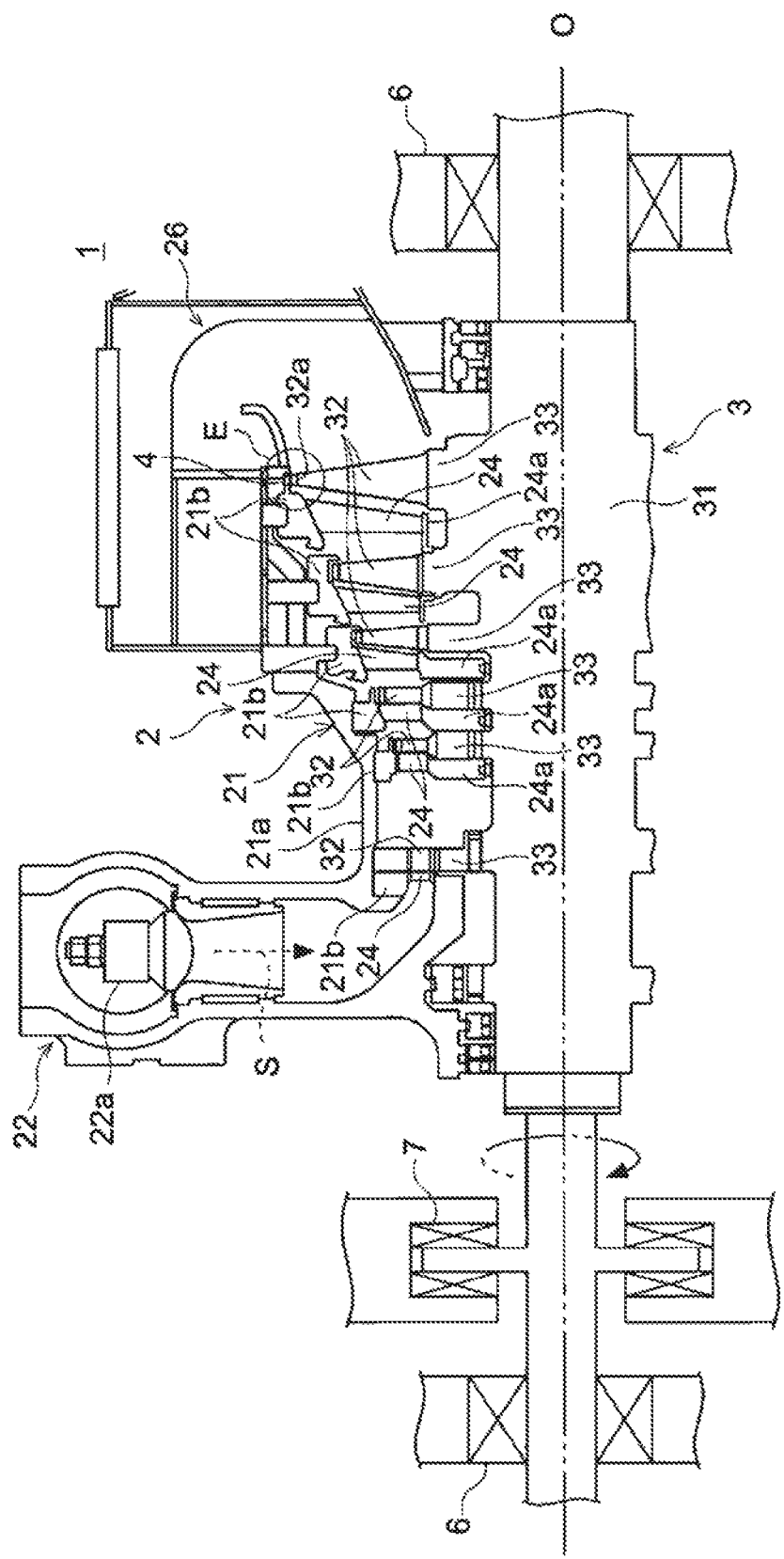
FIG. 1 is a schematic diagram of a rotary machine (steam turbine) of a turbine according to an embodiment.

First, as an example of a rotary machine 1 according to the present embodiment, the steam turbine shown in FIG. 1 will be described. FIG. 1 is a schematic diagram of a rotary machine (steam turbine) 1 according to an embodiment.

As shown in FIG. 1, the steam turbine 1 according to an embodiment includes a stationary member 2 including a casing 21 and stationary vanes 24, a rotary member 3 including a rotor (rotational shaft) 31 and rotor blades 32, and a sealing device 4 disposed in an annular gap 5 (see FIG. 2) between the stationary member 2 and the rotary member 3.

Specifically, the casing 21 has an interior space that is sealed air-tightly, while forming a steam passage 23 through which steam S (fluid) flows. In the shown example, the casing 21 has a hollow shape, and includes a cylindrical portion 21a disposed so as to surround the plurality of stationary vanes 24 and the plurality of rotor blades 32, and a plurality of annular portions 21b fixed to an inner wall surface of the cylindrical portion 21a. The plurality of annular portions 21b are provided to correspond to each pair of a stationary vane 24 and a rotor blade 32. A steam inlet 22 is disposed on one end side of the cylindrical portion 21a of the casing 21, and a steam outlet 26 is disposed on the other end side of the same. An adjustment valve 22a for opening and closing the steam passage 23 is attached to the steam inlet 22.

The rotor 31 is disposed so as to be inserted through the interior of the casing 21, and is supported by bearings 6, 7 so as to be rotatable about the axis O. The rotor 31 has the rotor blades 32 fixed to the outer peripheral portion of the rotor 31 via a rotor disc 33, inside the casing 21. The rotor blades 32 are disposed at a predetermined interval in a plurality of stages, in the axial direction of the rotor 31 (in the direction of the axis O). A tip shroud 32a extending in the circumferential direction is disposed on the outer side (tip-end side) of each of the rotor blades 32. The tip shroud 32a is disposed so as to face the annular portion 21b of the casing 21. Furthermore, on the side of the casing 21, a plurality of stages of stationary vanes 24 are fixed, so as to be arranged alternately with the plurality of stages of the rotor blades 32 in the axial direction. A hub shroud 24a extending in the circumferential direction is disposed on the inner side (hub side) of each of the stationary vanes 24. The hub shroud 24a is disposed so as to face the outer peripheral surface of the rotor 31.

Furthermore, inside the casing 21, the steam passage 23 is formed in a passage in which the rotor blades 32 and the stationary vanes 24 are disposed, and the steam passage 23 is in communication with the steam inlet 22 and the steam outlet 26.

In the steam turbine 1 having the above configuration, when steam is supplied to the steam passage 23 from the steam inlet 22, the rotor 31 rotates as the steam flowing along the axial direction in the steam passage 23 passes through the rotor blades 32 and the stationary vanes 24, and rotational energy imparted to the rotor 31 is extracted from the shaft end to be used in power generation or the like.

Figure 2:
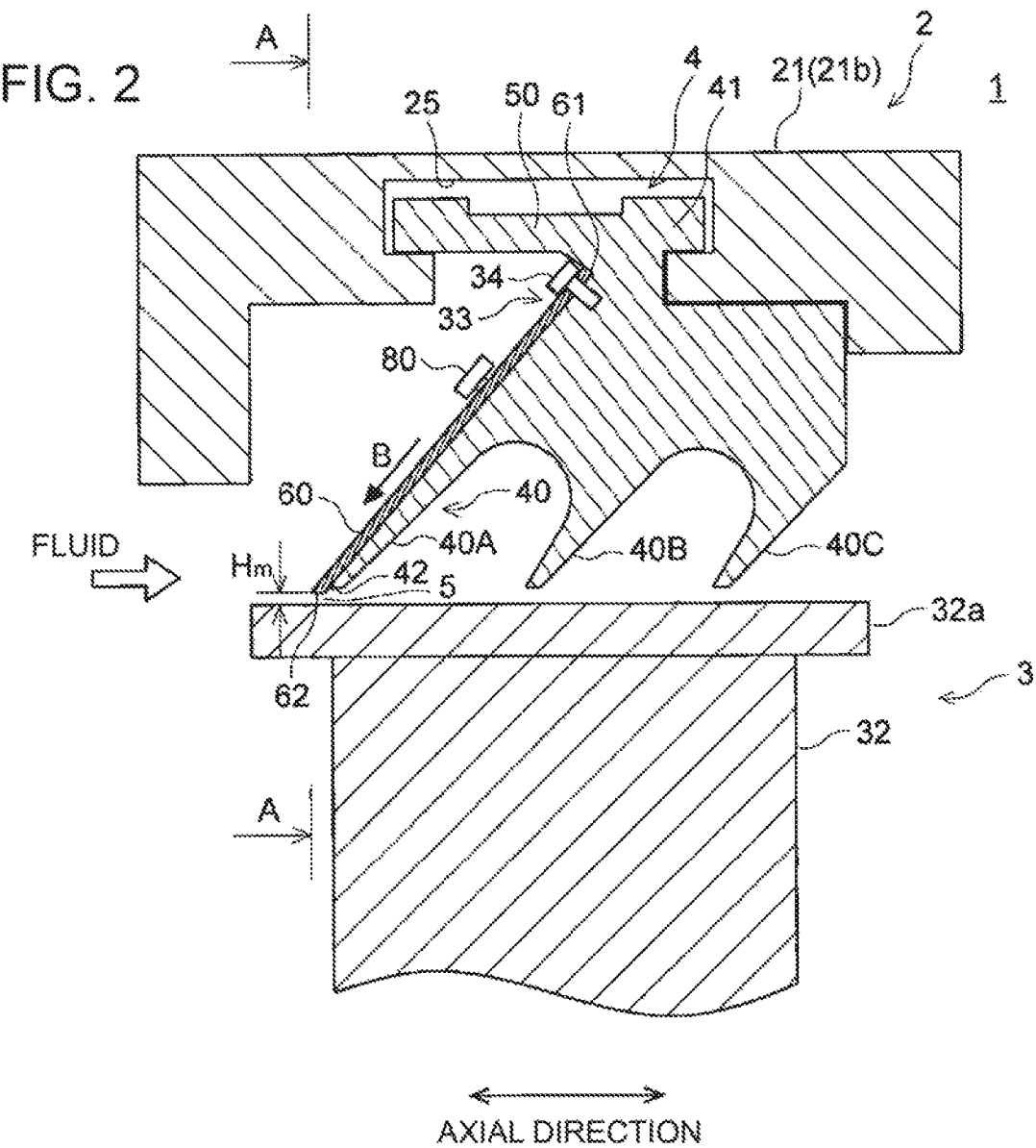
FIG. 2 is a partial cross-sectional view of a sealing device according to an embodiment, taken along its axial direction.
Figure 3:
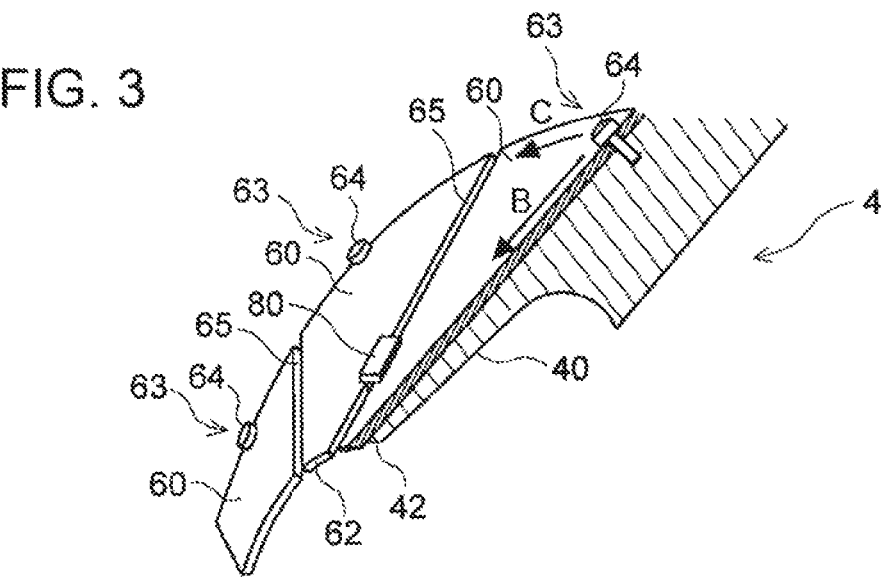
FIG. 3 is a perspective view (partial cross-sectional view) partially showing a fixed fin and a movable fin in an embodiment.
Figure 4:
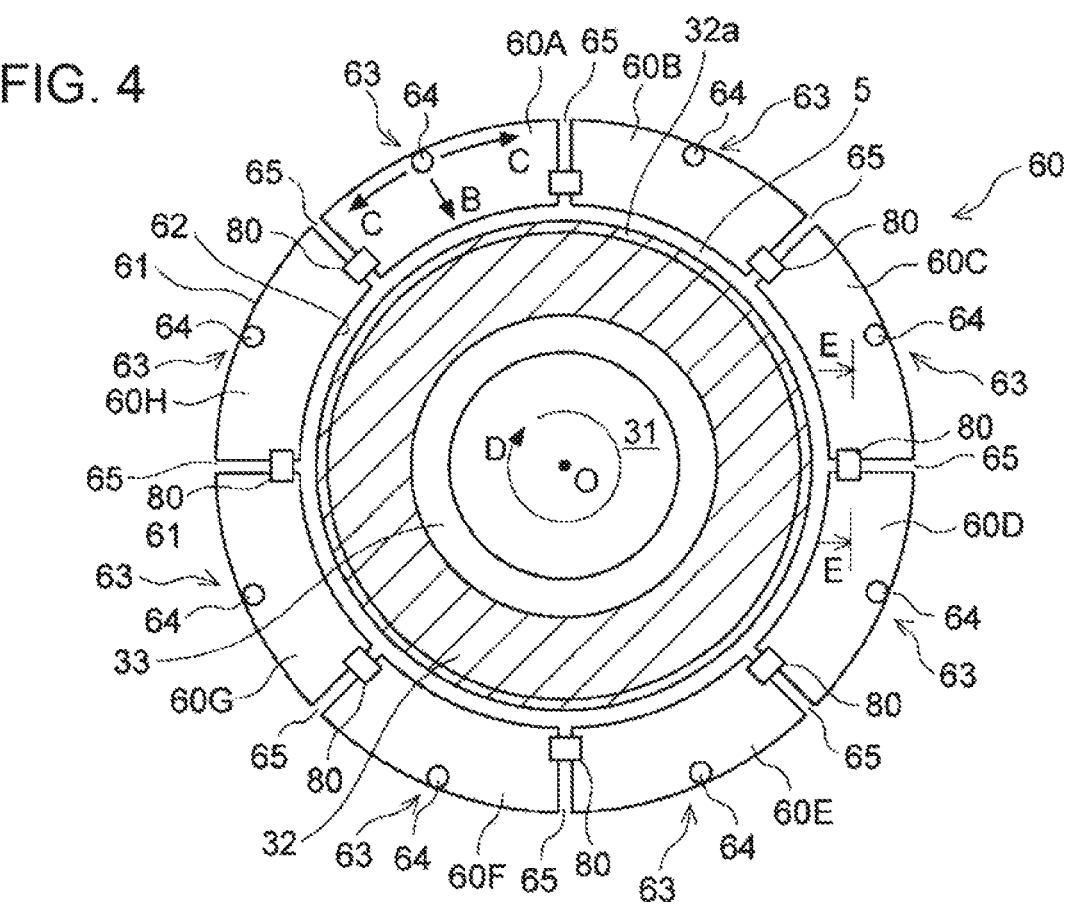
FIG. 4 is a planar view (as seen in the direction of arrow A in FIG. 2) showing a movable fin in an embodiment.

Next, with reference to FIGS. 1 to 4, the sealing device 4 will be described. FIG. 2 is a partial cross-sectional view of the sealing device 4 according to an embodiment, taken along its axial direction, showing section E of FIG. 1 in an enlarged view. FIG. 3 is a perspective view (partial cross-sectional view) partially showing a fixed or support fin 40 and a movable fin 60 in an embodiment. FIG. 4 is a planar view (as seen in the direction of arrow A in FIG. 2) showing a movable fin 60 in an embodiment. In FIG. 4, arrow D indicates the rotational direction of the rotor 31.

As shown in FIGS. 1 to 4, the sealing device 4 is provided in order to suppress a leakage flow of a fluid (working fluid) from the high-pressure side to the low-pressure side via the annular gap 5 between the stationary member 2 and the rotary member 3.

In the drawings, as an exemplary configuration, the sealing device 4 is mounted to the stationary member 2 (e.g. casing 21). Specifically, the sealing device 4 is mounted to the inner wall surface of the annular portion 21b of the casing 21 so as to face the tip shroud 32a of a rotor blade 32. It should be noted that the sealing device 4 may be mounted to the rotary member (e.g. rotor 31), as described below.

In an embodiment, the sealing device 4 includes a fixed fin 40 having an annular shape disposed in the annular gap 5, and a movable fin 60 having an annular shape and disposed next to the fixed fin 40 in the axial direction inside the annular gap 5.

The fixed fin 40 is mounted to the stationary member 2 in the annular gap 5. For instance, the fixed fin 40 may be fixed to the stationary member 2 (annular portion 21b of the casing 21 in the shown example) by welding or bolt fastening, for instance, or may be engaged with the stationary member 2 to be fixed thereto. Furthermore, the fixed fin 40 includes a root portion 41 positioned on the radially outer side (adjacent to the casing 21) and a tip portion 42 positioned on the radially inner side (adjacent to the rotor 31). As the whole fixed fin 40, the root portion 41 and the tip portion 42 form an annular shape.

The movable fin 60 has a greater heat expansion coefficient than the fixed fin 40. For instance, the movable fin 60 is formed of a material having a greater heat expansion coefficient than that of the fixed fin 40. Furthermore, the movable fin 60 includes a root portion 61 positioned on the radially outer side (adjacent to the casing 21) and a tip portion 62 positioned on the radially inner side (adjacent to the rotor 31). As the whole movable fin 60, the root portion 61 and the tip portion 62 form an annular shape. The movable fin 60 is attached to the fixed fin 40 only in the fixing region 63 on the side of the root portion 61. In the shown example, the movable fin 60 is fastened to the fixed fin 40 by a bolt 64. The fixing structure of the movable fin 60 to the fixed fin 40 will be described later.

Figure 5A:
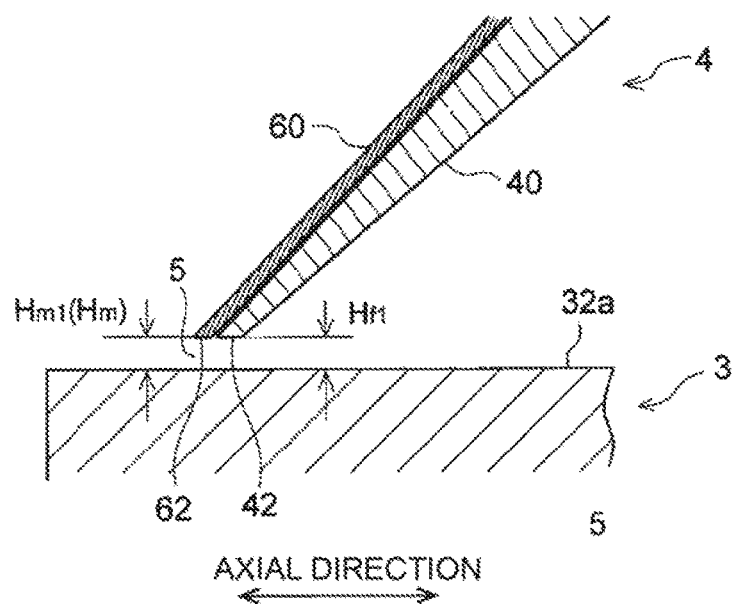
FIG. 5A is a cross-sectional view showing tip regions of a fixed fin and a movable fin at the time when the rotary machine is stopped, for a sealing device according to an embodiment.
Figure 5B:
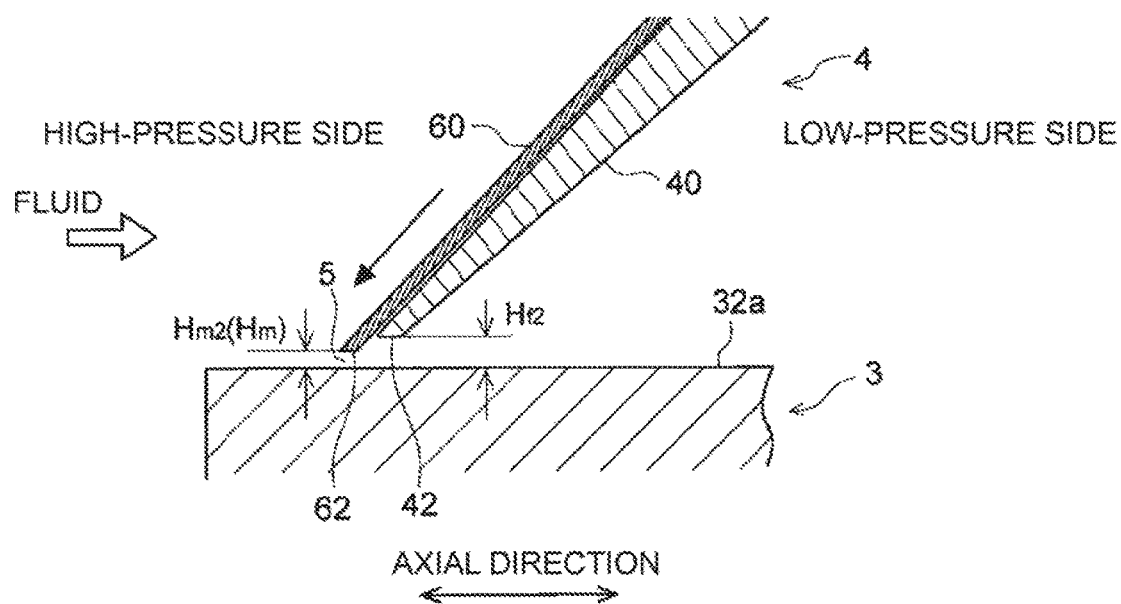
FIG. 5B is a cross-sectional view showing tip regions of a fixed fin and a movable fin at the time when the rotary machine is in rated operation, for a sealing device according to an embodiment.

With reference to FIGS. 5A and 5B, the function of the movable fin 60 will now be described.

FIG. 5A is a cross-sectional view showing tip regions of the fixed fin 40 and the movable fin 60 at the time when the rotary machine 1 is stopped, for the sealing device 4 according to an embodiment. FIG. 5B is a cross-sectional view showing tip regions of the fixed fin 40 and the movable fin 60 at the time when the rotary machine 1 is in rated operation, for the sealing device 4 according to an embodiment.

As shown in FIG. 5A, at the time when the rotary machine 1 is stopped, the fixed fin 40 and the movable fin 60 are not thermally expanded, and as shown in the drawing for instance, the tip portion 42 of the fixed fin 40 and the tip portion 62 of the movable fin 60 are substantially in the same position in the radial direction.

As shown in FIG. 5B, at the time when the rotary machine 1 is in operation, if the sealing device 4 is exposed to a high-temperature fluid, the movable fin 60 thermally expands at the side of the tip portion 62 in the direction of arrow B in the drawing, starting from the fixing region 63 on the side of the root portion 61. At this time, since the movable fin 60 has a greater thermal expansion coefficient than the fixed fin 40, the thermal expansion amount of the movable fin 60 at the side of the tip portion 62 is greater than the thermal expansion amount of the fixed fin 40 at the side of the tip portion 42. Thus, the clearance $H_m$ between the rotary member 3 and the tip portion 62 of the movable fin 60 of the sealing device 4 is small as compared to that at the time when the rotary machine 1 is stopped shown in FIG. 5A, and thus it is possible to suppress a leakage flow of a fluid via the clearance $H_m$.

The above movable fin 60 may be disposed on the high-pressure side of the fixed fin 40, as shown in FIG. 2. In the example shown in FIG. 2, the movable fin 60 is disposed so as to be in surface contact with a high-pressure side surface of the fixed fin 40. In FIG. 2, the fluid flows from left to right, and thus the left side of the sealing device 4 is the high-pressure side and the right side of the same is the low-pressure side.

With this configuration, when the rotary machine 1 is in operation, the movable fin 60 is pressed against the fixed fin 40 by a high-pressure fluid, and thus it is possible to suppress separation of the movable fin 60 from the fixed fin 40.

As shown in FIGS. 2, 3, 5A, and 5B, the above fixed fin 40 and the movable fin 60 may extend obliquely with respect to the radial direction, such that the tip portion 42 of the fixed fin 40 and the tip portion 62 of the movable fin 60 are positioned on the high-pressure side of the root portion 41 of the fixed fin 40 and the root portion 61 of the movable fin 60. In the examples shown in FIGS. 2, 3, 5A, and 5B, the fixed fin 40 is formed to have a linear shape from the root portion 41 to the tip portion 42, and to be inclined with respect to the radial direction so that the tip portion 42 of the fixed fin 40 is positioned on the high-pressure side of the root portion 41.

Similarly, the movable fin 60 is formed to have a linear shape from the root portion 61 to the tip portion 62, and to be inclined with respect to the radial direction so that the tip portion 62 of the movable fin 60 is positioned on the high-pressure side of the root portion 61. In this case, the inclination angles of the fixed fin 40 and the movable fin 60 are substantially the same.

With this configuration, the length of the movable fin 60 (distance from the root portion 61 to the tip portion 62 of the movable fin 60) can be ensured sufficiently, which makes it possible to, during operation of the rotary machine 1, enjoy an improved effect to suppress a leakage flow from reduction of the clearance $H_m$ utilizing thermal expansion deformation of the movable fin 60.

Furthermore, although not depicted, the fixed fin 40 and the movable fin 60 may extend along the radial direction so as to intersect with the axis O of the rotor 31 at right angle.

In an embodiment, as shown in FIG. 2, a groove 25 is formed in the stationary member 2 to which the fixed fin 40 is attached.

The sealing device 4 further includes a seal ring 50 which is engaged with the groove 25 of the stationary member 2 and which has at least one fixed fin 40 on the tip-end side.

The movable fin 60 extends obliquely with respect to the radial direction, from the root portion 61 of the movable fin 60 disposed in the axial-directional range of the groove 25 toward the tip portion 62 of the movable fin 60 positioned outside the axial-directional range of the groove 25.

With this configuration, the length of the movable fin 60 (distance from the root portion 61 to the tip portion 62 of the movable fin 60) can be ensured sufficiently, which makes it possible to, during operation of the rotary machine 1, enjoy an improved effect to suppress a leakage flow from reduction of the clearance $H_m$ utilizing thermal expansion deformation of the movable fin 60.

In this case, as shown in FIG. 2, the movable fin 60 may be positioned such that at least the root portion 61 of the movable fin 60 exists inside the groove 25.

With this configuration, since the root portion 61 of the movable fin 60 is disposed inside the groove 25, it is possible to increase the length of the movable fin 60 (length from the root portion 61 to the tip portion 62 of the movable fin 60) even further.

Furthermore, in a case where the seal ring 50 has a plurality of fixed fins 40A, 40B, 40C arranged in the axial direction at the tip-end side, the movable fin 60 is disposed at least on the high-pressure side of the fixed fin 40A positioned most upstream with respect to the leakage flow. In the example shown in FIG. 2, the seal ring 50 has three fixed fins 40A, 40B, 40C at the tip-end side of the seal ring 50, in this order from upstream with respect to the flow direction of a fluid. Of the above fixed fins 40A, 40B, 40C, the movable fin 60 is mounted by the bolt 34 to a high-pressure side surface of the fixed fin 40A, which is disposed most upstream with respect to the flow direction of fluid. Furthermore, the number of fixed fins 40 provided for one seal ring 50 is not particularly limited.

With this configuration, for the seal ring 50 having a plurality of stages of fixed fins 40A, 40B, 40C, the movable fin 60 is mounted to the high-pressure side of the most upstream fixed fin 40, and thereby it is possible to suppress separation of the movable fin 60 from the fixed fin 40 utilizing the pressure of the fluid, also in the sealing device 4 having a plurality of stages of fixed fins 40A, 40B, 40C.

If, hypothetically, the movable fin 60 is to be mounted to the high-pressure side of the fixed fin 40C on the downstream side, in the sealing device 4 having a plurality of fixed fins 40A, 40B, 40C, (i.e., if the movable fin 60 is to be mounted between the fixed fins 40B, 40C disposed next to each other), it is necessary to reduce the size of the movable fin 60. In this case, the length of the movable fin 60 (distance from the root portion 61 to the tip portion 62 of the movable fin 60) could be insufficient, and it may be difficult to achieve a sufficient thermal expansion amount of the movable fin 60. This may limit the effect to suppress a leakage flow from reduction of the clearance $H_m$ utilizing thermal expansion deformation of the movable fin 60 during operation of the rotary machine 1.

In the sealing device 4 having the above configuration, the fixed fin 40 and the movable fin 60 may have the following configuration.

As shown in FIG. 5A, $H_{m1}$ refers to the clearance formed between the rotary member 3 and the movable fin 60, and $H_{f1}$ refers to the clearance formed between the rotary member 3 and the fixed fin 40, at the time when the rotary machine 1 is stopped. Furthermore, as shown in FIG. 5B, $H_{m2}$ refers to the clearance formed between the rotary member 3 and the movable fin 60, and $H_{f2}$ refers to the clearance formed between the rotary member 3 and the fixed fin 40, at the time when the rotary machine 1 is in rated operation.

In this case, the fixed fin 40 and the movable fin 60 satisfy $H_{m1} \geq H_{f1}$ and $H_{m2} < H_{f2}$.

Generally, during its startup, the rotary machine 1 temporarily experiences, as a transient state before reaching the normal state, a state in which the sealing gap 5 reaches its minimum (pinch point), due to the vibration of the rotor 31 of the rotary machine 1 or the expansion difference between the rotary member 3 and the stationary member 2. During rated operation after passing the pinch point, the annular gap 5 widens slightly compared to the state at the pinch point. Thus, if the sealing gap 5 is too small during operation of the rotary machine 1, the sealing device 4 (e.g. tip portion 62 of the movable fin 60) may make contact with the rotary member 3 at the pinch point.

In view of this, with the above configuration, when the rotary machine 1 is stopped as shown in FIG. 5A, the clearance $H_{m1}$ formed between the rotary member 3 and the movable fin 60 is not smaller than the clearance $H_{f1}$ formed between the rotary member 3 and the fixed fin 40, and thus it is possible to reduce the risk of contact between the rotary member 3 and the movable fin 60, at the pinch point that the rotary machine 1 experiences during startup.

Furthermore, during rated operation of the rotary machine 1 shown in FIG. 5, the clearance $H_{m2}$ formed between the rotary member 3 and the movable fin 60 is smaller than the clearance $H_{f2}$ formed between the rotary member 3 and the fixed fin 40, and thus it is possible to suppress a leakage flow of a fluid via the clearance $H_{m2}$.

As shown in FIGS. 2 to 4, in an embodiment, the movable fin 60 includes a plurality of segments 60A to 60H arranged in the circumferential direction.

The number of the plurality of segments 60A to 60H may be an even number. Accordingly, it is possible to improve the efficiency of the assemble work of the sealing device 4 by providing fixed fins 40 having a halved structure. In this case, assembly of the sealing device 4 is completed by preparing a pair of fixed fins 40 having a semi-circle shape and having an integer number of segments 60A to 60H assembled thereto, and attaching the pair to the rotary machine 1.

Each of the segments 60A to 60H has a fixing region 63 to be fixed to the fixed fin 40 at the side of the root portion 61. In the shown example, the movable fin 60 is fixed to the fixed fin 40 by one bolt 64 in the fixing region 63.

In this case, the fixing region 63 is a part of the circumferential-directional range of the segments 60A to 60H at the side of the root portion 61, and each of the segments 60A to 60H of the movable fin 60 may be allowed to expand thermally in the radial direction (direction of arrow B in FIGS. 2 to 4) and in the circumferential direction (direction of arrow C in FIGS. 3 and 4) starting from the fixing region 63.

Further in this case, the fixing region 63 may be positioned in the center with respect to the circumferential direction, in the circumferential-directional range of the segments 60A to 60H at the side of the root portion 61.

With the above configuration, the movable fin 60 is divided into a plurality of segments 60A to 60H in the circumferential direction, and thus each of the segments 60A to 60H has a reduced restraining force against thermal expansion deformation, which makes it possible to further reduce the clearance $H_m$ utilizing thermal expansion of each segment 60A to 60H when the rotary machine 1 is in operation. Accordingly, it is possible to suppress a leakage flow of a fluid via the clearance $H_m$ effectively.

Furthermore, with the fixing region 63 of each segment 60A to 60H of the movable fin 60 fixed to the fixed fin 40 being a part of the circumferential-directional range of the segments 60A to 60H at the side of the root portion 61, each of the segments 60A to 60H is allowed to expand thermally not only in the radial direction (direction of arrow B in FIGS. 2 to 4) but also in the circumferential direction (direction of arrow C in FIGS. 3 and 4) starting from the fixing region 63. Thus, when the segments 60A to 60H thermally expand during startup of the rotary machine 1, it is possible to further weaken the restraint between the adjacent segments 60A to 60H. Thus, during operation of the rotary machine 1, it is possible to further reduce the clearance $H_m$ utilizing thermal expansion of each segment 60A to 60H of the movable fin 60. Accordingly, it is possible to suppress a leakage flow of a fluid via the clearance $H_m$ effectively.

Furthermore, with the fixing region 63 of each segment 60A to 60H being disposed in the center with respect to the circumferential direction of each segment 60A to 60H, the regions on both sides of the fixing region, in the circumferential direction, of each segment 60A to 60H are not restrained by the fixed fin 40. Thus, during operation of the rotary machine 1, each segment 60A to 60H of the movable fin 60 is allowed to thermally expand even more flexibly, and it is possible to reduce the clearance $H_m$ even further. Accordingly, it is possible to suppress a leakage flow of a fluid via the clearance $H_m$ even more effectively.

In an embodiment, further provided is a restraining member 80 for suppressing separation of each segment of the movable fin from the fixed fin. The restraining member 80 is mounted to the fixed fin 40 at a position closer to the tip portion 62 than the fixing region 63.

As described above, each segment 60A to 60H of the movable fin 60 is not fixed to the fixed fin 40 at the tip portions 62. Thus, there is a risk of a fluid entering the gap between the tip portion 62 of the movable fin 60 and the tip portion 42 of the fixed fin 40, and causing each segment 60A to 60H of the movable fin 60 to separate from the fixed fin 40.

In view of this, the restraining member 80 is mounted to the fixed fin 40 at a position closer to the tip portion 62 of the movable fin 60 than the fixing region 63, and thereby it is possible to suppress separation of each segment 60A to 60H of the movable fin 60 from the fixed fin 40.

Figure 6A:
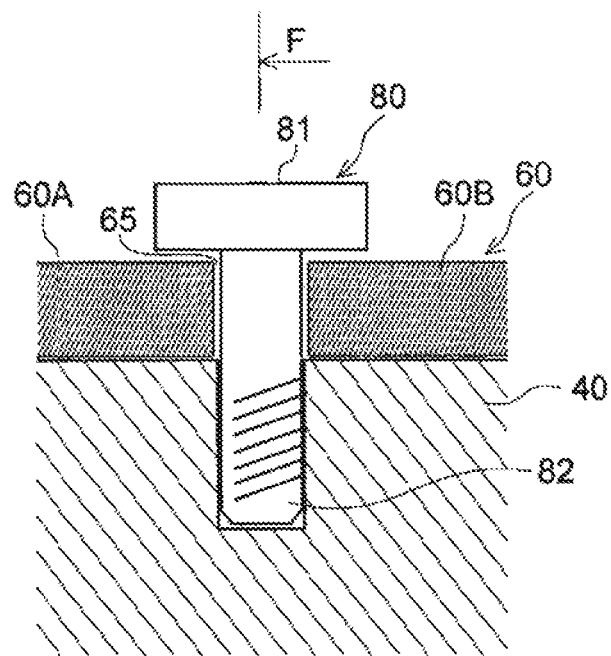
FIG. 6A is a cross-sectional view (corresponding to cross-section taken along line E-E in FIG. 4) showing a configuration example of a restraining member and its surrounding structure.
Figure 6B:
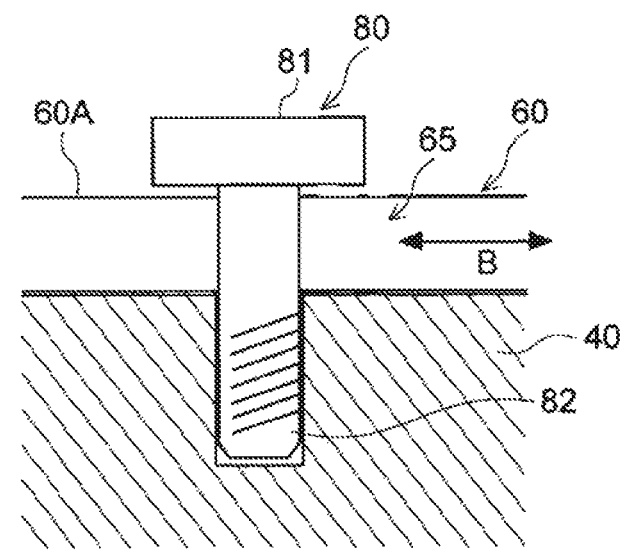
FIG. 6B is a cross-sectional view (corresponding to cross-section taken along line F-F in FIG. 6A) showing a configuration example of a restraining member and its surrounding structure.

Specifically, as shown in FIGS. 6A and 6B, the restraining member 80 includes a supporting rod portion 82 and a holding plate portion 81. FIG. 6A is a cross-sectional view (corresponding to cross-section taken along line E-E in FIG. 4) showing a configuration example of a restraining member 80 and its surrounding structure. FIG. 6B is a cross-sectional view (corresponding to cross-section taken along line F-F in FIG. 6A) showing a configuration example of a restraining member 80 and its surrounding structure. In the following example, reference numerals shown in FIGS. 2 to 4 are used where appropriate.

The supporting rod portion 82 is fixed to the fixed fin 40 so as to extend between adjacent two of the segments 60A to 60H (see FIG. 4). For instance, the supporting rod portion 82 may be fixed to the fixed fin 40 by forming in advance a male thread portion on a section of the supporting rod portion 82 to be fixed to the fixed fin 40, forming in advance a female thread portion on a section of the fixed fin 40 corresponding thereto, and screwing the male thread portion and the female thread portion together. Alternately, the supporting rod portion 82 may be fixed to the fixed fin 40 by welding the supporting rod portion 82 to the fixed fin 40.

The holding plate portion 81 is a plate-shaped member disposed on the tip of the supporting rod portion 82, and extends in the circumferential direction from the supporting rod portion 82 such that the segments 60A to 60H are at least partially nipped between the fixed fin 40 and the holding plate portion 81.

With this configuration, by using the restraining member 80 including the supporting rod portion 82 fixed to the fixed fin 40 between adjacent segments 60A to 60H and the holding plate portion 81 disposed on the tip of the supporting rod portion 82, it is possible to suppress separation of each segment 60A to 60H from the fixed fin 40 without affecting thermal expansion deformation of each segment 60A to 60H substantially.

Between adjacent two of the segments 60A to 60H, a circumferential-directional gap 65 may be formed at least when the rotary machine 1 is stopped. The circumferential-directional gap 65 is formed by adjacent two of the segments 60A to 60H being disposed at an interval in the circumferential direction from each other, and extends in the radial direction. In the example shown in FIG. 4, when the rotary machine 1 is stopped, the circumferential-directional gap 65 has a constant gap width.

Accordingly, with the circumferential-directional gap 65 formed between adjacent two of the segments 60A to 60H, it is possible to further weaken the restraint between the adjacent segments 60A to 60H. Thus, during operation of the rotary machine 1, it is possible to further reduce the clearance $H_m$ utilizing thermal expansion of each segment 60A to 60H of the movable fin 60.

Figure 7:
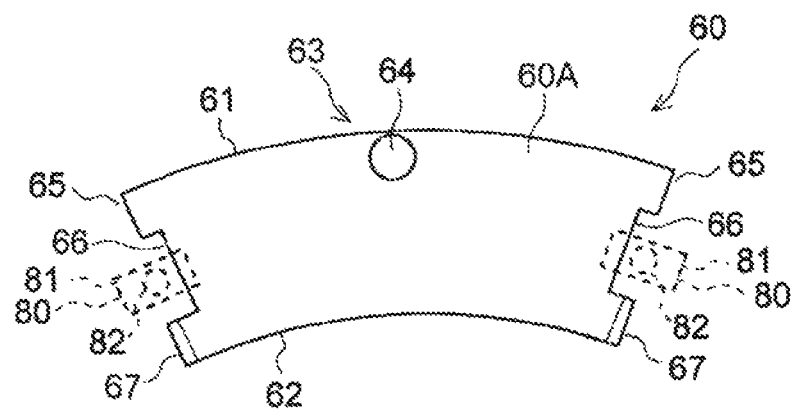
FIG. 7 is a planar view showing another configuration example of a segment of a movable fin.

FIG. 7 is a planar view showing another configuration example of segments 60A to 60H of the movable fin 60.

In another configuration example, the circumferential-directional gap 65 may not necessarily have a constant width in the radial direction. In other words, in the example shown in the drawing, the circumferential-directional gap 65 has a wide width portion 66 having a greater gap width than other parts, partially in the radial direction. The wide width portion 66 is configured such that the supporting rod portion 82 of the restraining member 80 is insertable through the wide width portion 66, and the circumferential-directional gap 65 other than the wide width portion 66 is smaller than the diameter of the supporting rod portion 82. Furthermore, the wide width portion 66 has a constant length in the radial direction, and each segment 60A to 60H is slidable in the radial direction with respect to the supporting rod portion 82 for a distance corresponding to the length of the wide width portion 66 in the radial direction.

Furthermore, the circumferential-directional gap 65 may have, at the side of the tip portion 62 of the movable fin 60, a small width portion 67 having a smaller gap width than the circumferential directional gap 65 on the side of the root portion 61. Accordingly, with the gap width being smaller at the side of the tip portion 62 of the movable fin 60 than at the side of the root portion 61 of the movable fin 60, it is possible to further narrow the gap between the segments 60A to 60H at the side of the tip portion 62 in a state where the movable fin 60 is thermally expanded, and to prevent a fluid from leaking out from the gap between the segments 60A to 60H. Furthermore, each segment 60A to 60H of the movable fin 60 has a greater length at the side of the root portion 61 than at the side of the tip portion 62. Thus, during operation of the rotary machine 1, the thermal expansion amount is greater at the side of the root portion 61 than at the side of the tip portion 62. Thus, it is possible to absorb thermal expansion at the side of the root portion 61 of the movable fin 60 by widening the circumferential-directional gap 65 at the side of the root portion 61 compared to the circumferential-directional gap 65 at the side of the tip portion 62.

In an embodiment, as shown in FIGS. 5A and 5B, the tip thickness of the movable fin 60 is smaller than the tip thickness of the fixed fin 40.

For instance, as shown in the drawing, the movable fin 60 has a substantially constant thickness in the radial direction. On the other hand, the fixed fin 40 has a thickness that reduces gradually from the root portion 41 toward the tip portion 42. Further, in the tip region, the thickness of the movable fin 60 is smaller than the thickness of the fixed fin 40.

Alternatively, although not shown, the thickness may reduce gradually from the root portion 61 toward the tip portion 62 in the tip region of the movable fin 60. Also in this case, in the tip region, the thickness of the movable fin 60 is smaller than the thickness of the fixed fin 40.

As described above, the movable fin 60 has a greater thermal expansion coefficient than the fixed fin 40, and thus the clearance $H_m$ may become excessively narrow due to thermal expansion of the movable fin 60, transiently during startup of the rotary machine 1. Thus, there is a risk of contact between the rotary member 3 of the rotary machine 1 and the tip portion 62 of the movable fin 60.

Thus, with the tip thickness of the movable fin 60 being relatively smaller than that of the fixed fin 40, it is possible to suppress heat generation and vibration due to contact, even in case the rotary member 3 of the rotary machine 1 and the tip portion 62 of the movable fin 60 make contact with each other. Furthermore, with the tip thickness of the fixed fin 40 being relatively greater than that of the movable fin 60, it is possible to suppress deformation of the tip portion 42 of the fixed fin 40 due to the pressure difference of the fluid at both sides of the movable fin 60 and the fixed fin 40 in the axial direction, and to suppress unexpected displacement of the movable fin 60 that accompanies deformation of the fixed fin 40.

Figure 8A:
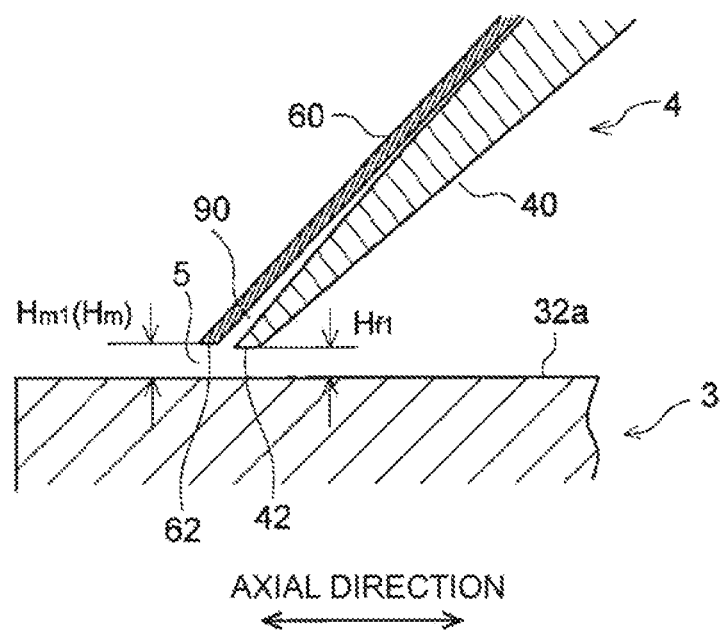
FIG. 8A is a cross-sectional view showing tip regions of a fixed fin and a movable fin at the time when the rotary machine is stopped, for a sealing device according to another embodiment.
Figure 8B:
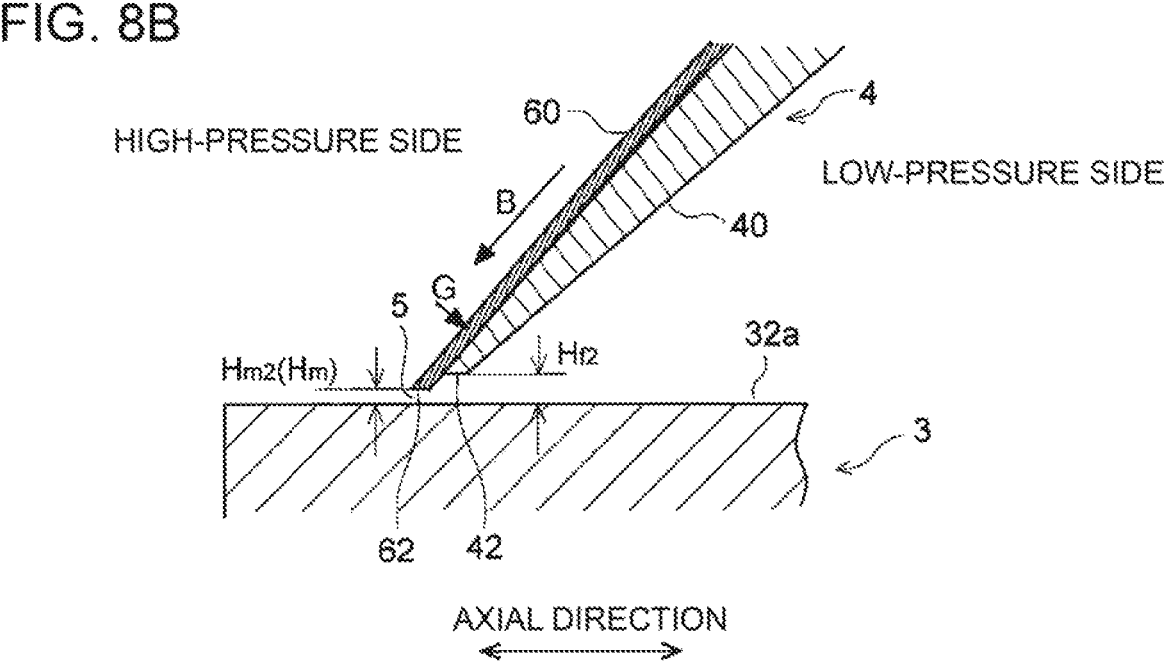
FIG. 8B is a cross-sectional view showing tip regions of a fixed fin and a movable fin at the time when the rotary machine is in rated operation, for a sealing device according to another embodiment.

In another embodiment, as shown in FIGS. 8A and 8B, when the rotary machine 1 is stopped, a gap 90 is formed between the tip portion 62 of the movable fin 60 and the tip portion 52 of the fixed fin 40. FIG. 8A is a cross-sectional view showing tip regions of a fixed fin and a movable fin at the time when the rotary machine is stopped, for a sealing device according to another embodiment. FIG. 8B is a cross-sectional view showing tip regions of a fixed fin and a movable fin at the time when the rotary machine is in rated operation, for a sealing device according to another embodiment.

As shown in FIG. 8A, when the rotary machine 1 is stopped, the movable fin 60 has, for instance, a substantially constant thickness from the root portion 61 toward the tip portion 62. In contrast, the fixed fin 40 has at least a part curved so as to protrude upstream (toward the high-pressure side) with respect to the flow direction of fluid, between the root portion 41 (see FIG. 2) and the tip portion 42. Alternatively, the fixed fin 40 may include, at the side of the tip portion 42, an inclined tapered surface in a direction away from the movable fin 60. Accordingly, when the rotary machine 1 is stopped, a gap 90 is formed between the tip portion 62 of the movable fin 60 and the tip portion 42 of the fixed fin 40.

As shown in FIG. 8B, during rated operation of the rotary machine 1, the movable fin 60 disposed on the high-pressure side is pressed against a high-pressure side surface of the fixed fin 40 by the fluid (i.e. pushed in the direction of arrow G in the drawing), and thereby the movable fin 60 deforms at the side of the tip portion 62. Accordingly, by utilizing deformation of the movable fin 60 due to the pressing force of the fluid toward the fixed fin 40, in addition to thermal expansion deformation of the movable fin 60, it is possible to control the clearance $H_m$ with a higher flexibility during operation of the rotary machine 1. Thus, it is possible to suppress a leakage flow of a fluid via the clearance $H_m$ even more appropriately.

As shown in FIG. 8A, $H_{m1}$ refers to the clearance formed between the rotary member 3 and the movable fin 60, and $H_{f1}$ refers to the clearance formed between the rotary member 3 and the fixed fin 40, at the time when the rotary machine 1 is stopped. Furthermore, as shown in FIG. 8B, $H_{m2}$ refers to the clearance formed between the rotary member 3 and the movable fin 60, and $H_{f2}$ refers to the clearance formed between the rotary member 3 and the fixed fin 40, at the time when the rotary machine 1 is in rated operation.

In this case, the fixed fin 40 and the movable fin 60 may satisfy $H_{m1} \geq H_{f1}$ and $H_{m2} < H_{f2}$.

In yet another embodiment, as shown in FIG. 9, the fixed fin 40 and the movable fin 60 are curved in the axial-directional cross section of the rotary machine 1.

With this configuration, the length of the movable fin 60 (distance from the root portion 61 to the tip portion 62 of the movable fin 60) can be ensured sufficiently, which makes it possible to, during operation of the rotary machine 1, enjoy an improved effect to suppress a leakage flow from reduction of the clearance $H_m$ utilizing thermal expansion deformation of the movable fin 60.

In this case, the fixed fin 40 and the movable fin 60 may further include following configuration.

Provided that $\theta_{f1}$ is the angle formed between the radial direction and the tangent direction $T_1$ at the side of the root portion 41 of the fixed fin 40, and $\theta_{f2}$ is the angle formed between the radial direction and the tangent direction $T_2$ at the side of the tip portion 42 of the fixed fin 40, the movable fin 60 is curved along the fixed fin 40 such that the tangent directions T in the axial-directional cross section of the surface, on the side adjacent to the movable fin 60, of the fixed fin 40 satisfy a relationship $\theta_{f1} > \theta_{f2}$.

With this configuration, also for the movable fin 60 curved along the fixed fin 40, the angle $\theta_{f2}$ formed between the radial direction and the tangent direction $T_2$ of the movable fin 60 is smaller at the side of the tip portion 62 than at the root portion 61. In other words, the movable fin 60 is relatively more conforming to the radial direction at the side of the tip portion 62 than at the root portion 61. Thus, it is possible to increase the ratio of the amount of change of the clearance $H_m$ to the amount of thermal expansion deformation at the tip portion 62 of the movable fin 60, which makes it possible to, during operation of the rotary machine 1, enjoy an even more improved effect to suppress a leakage flow from reduction of the clearance $H_m$ utilizing thermal expansion deformation of the movable fin 60.

As described above, according to an embodiment of the present invention, during operation of the rotary machine 1, the clearance $H_m$, between the stationary member 2 or the rotary member 3 of the rotary machine 1 and the tip portion 62 of the movable fin 60 of the sealing device 4, is small as compared to that at the time when the rotary machine 1 is stopped, and thus it is possible to suppress a leakage flow of a fluid via the clearance $H_m$.

Furthermore, as shown in FIG. 1, the rotary machine 1 includes the stationary member 2, the rotary member 3 disposed so as to face the stationary member 2, and the above sealing device 4 (see FIGS. 1 to 9) disposed in the annular gap 5 between the stationary member 2 and the rotary member 3, and thereby the following effect can be achieved.

The rotary machine 1 includes the sealing device 4 as shown in FIGS. 1 to 9, and thus the clearance $H_m$, between the rotary member 3 (or the stationary member 2) and the tip portion 62 of the movable fin 60 of the sealing device 4 is smaller when the rotary machine 1 is in operation than when the rotary machine 1 is stopped, and thus it is possible to suppress a leakage flow of a fluid via the clearance $H_m$, and to improve the efficiency of the rotary machine 1.

Embodiments of the present invention were described in detail above, but the present invention is not limited thereto, and various amendments and modifications may be implemented.

For instance, in the above described embodiment, as shown in FIG. 1, a steam turbine is described as an example of the rotary machine 1 for applying the above sealing device 4. However, the rotary machine 1 for applying the sealing device 4 may be other rotary machines having the problem of a leakage flow between the stationary member 2 and the rotary member 3, such as gas turbines.

Figure 10A:
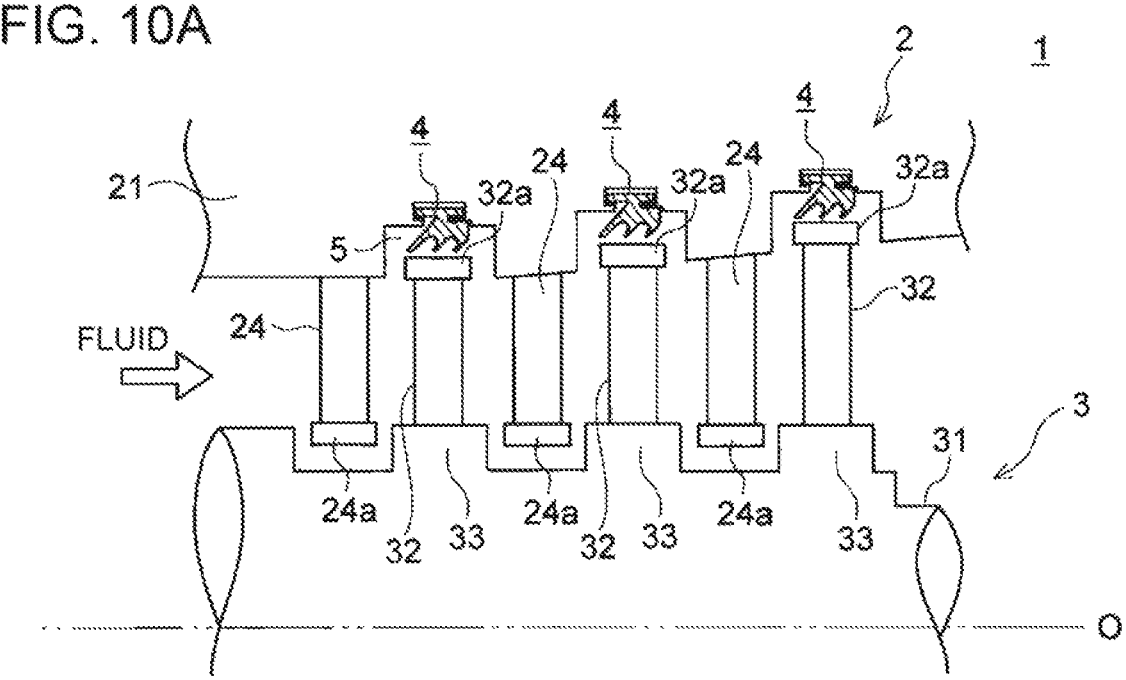
FIG. 10A is a schematic diagram of a section to which a sealing device is applied according to an embodiment.

Furthermore, in the above embodiment, as shown in FIG. 1, the casing 21 of the stationary member 2 is described as an example of section to which the sealing device 4 is to be mounted. In other words, in an embodiment as shown in FIG. 10A, the sealing device 4 is mounted to the inner wall surface of the casing 21 so as to face the tip shroud 32a of a rotor blade 32. Further, the sealing device 4 is configured to suppress a leakage flow of a fluid in the annular gap 5 between the tip shroud 32a and the casing 21. However, the location for applying the sealing device 4 is not limited to this.

Figure 10B:
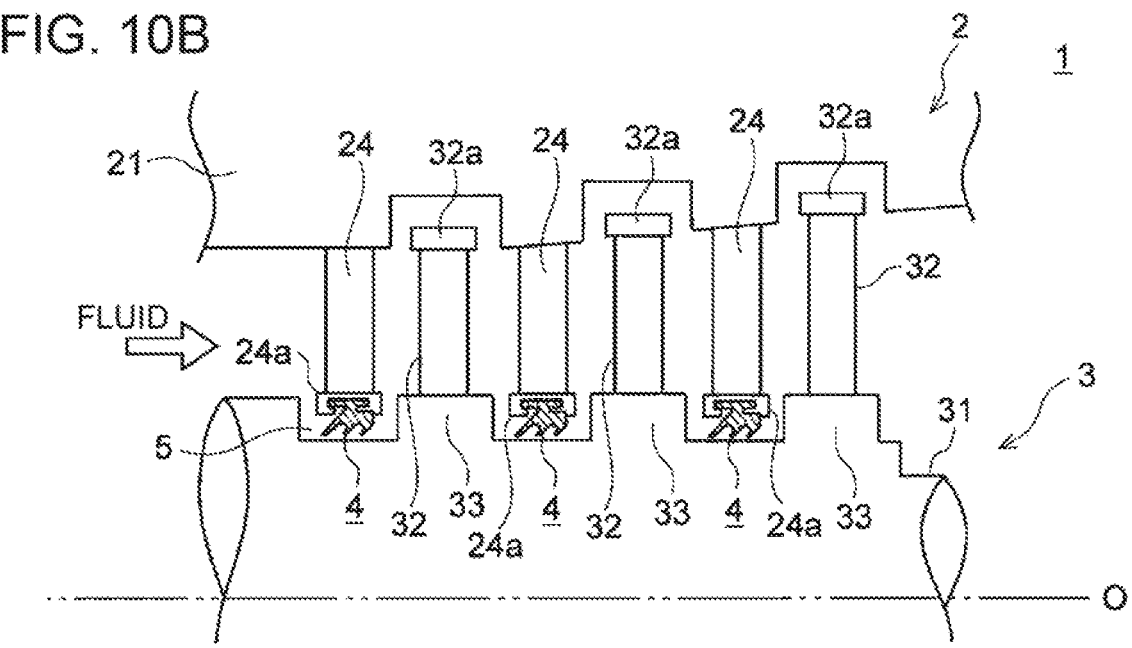
FIG. 10B is a schematic diagram of a section to which a sealing device is applied according to another embodiment.

In another embodiment, as shown in FIG. 10B, the sealing device 4 is mounted to a hub shroud 24a of a stationary vane 24 so as to face the outer peripheral surface of the rotor 31. Further, the sealing device 4 is configured to suppress a leakage flow of a fluid in the annular gap 5 between the rotor 31 and the hub shroud 24a.

Figure 10C:
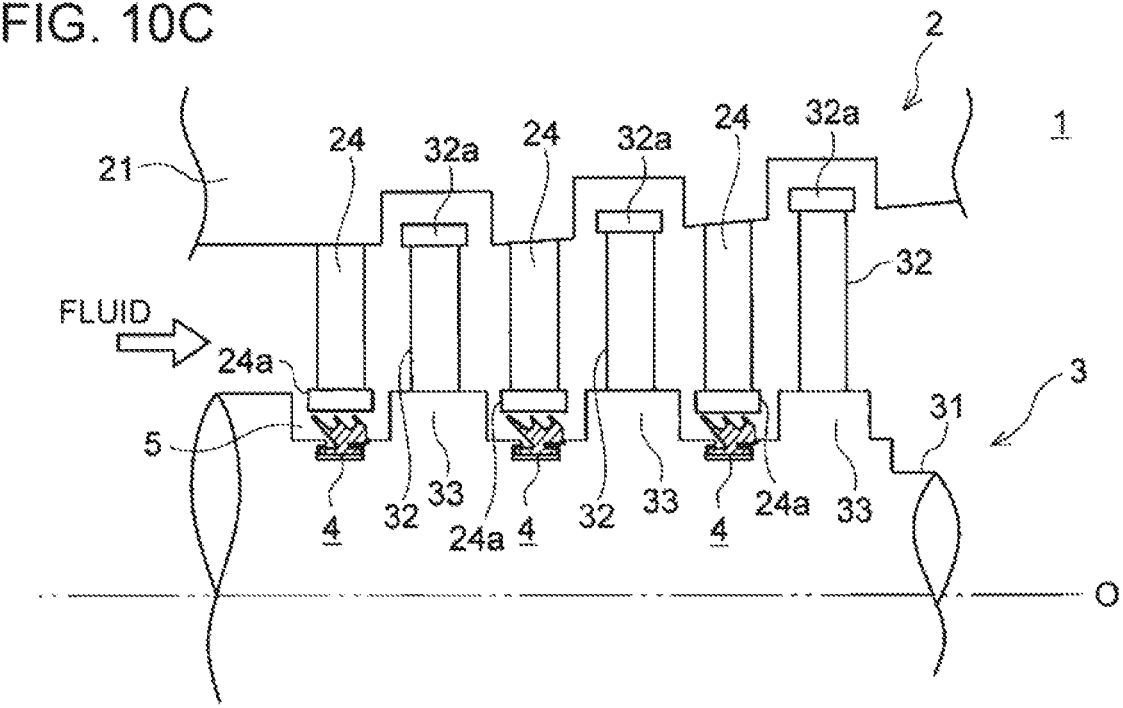
FIG. 10C is a schematic diagram of a section to which a sealing device is applied according to yet another embodiment.
Figure 10D:
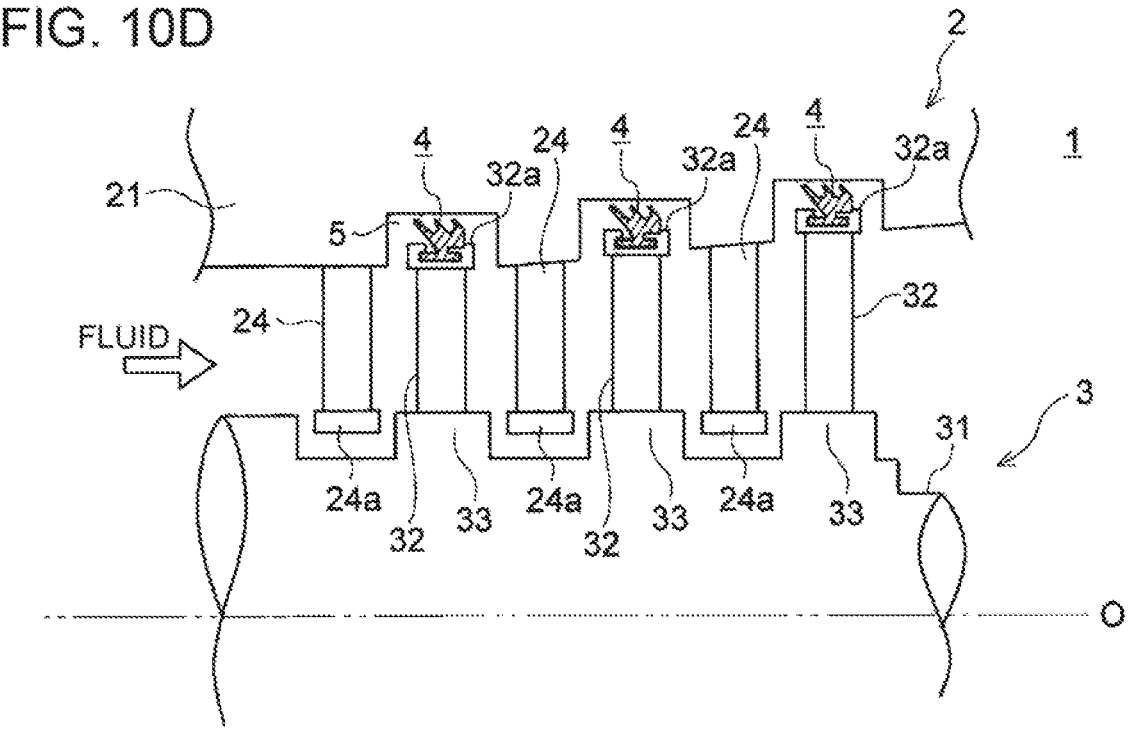
FIG. 10D is a schematic diagram of a section to which a sealing device is applied according to yet another embodiment.

In yet another embodiment, as shown in FIGS. 10C and 10D, the sealing device 4 may be mounted to the rotary member 3. In the example shown in FIG. 10C, the sealing device 4 is mounted to the outer peripheral surface of the rotor 31 so as to face the hub shroud 24a of the stationary vane 24. Further, the sealing device 4 is configured to suppress a leakage flow of a fluid in the annular gap 5 between the rotor 31 and the hub shroud 24a. In the example shown in FIG. 10D, the sealing device 4 is mounted to the tip shroud 32a of the rotor blade 32 so as to face the inner wall surface of the casing 21. Further, the sealing device 4 is configured to suppress a leakage flow of a fluid in the annular gap 5 between the tip shroud 32a and the casing 21.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Rotary machine (steam turbine)
2 Stationary member
3 Rotary member
4 Sealing device
5 Annular gap
21 Casing
24 Stationary vane
25 Groove
31 Rotor (rotational shaft)
32 Rotor blade
40, 40A to 40C Fixed fin
41 Root portion
42 Tip portion
50 Seal ring
60 Movable fin
60A to 60H Segment
61 Root portion
62 Tip portion
63 Fixing region
64 Bolt
65 Circumferential-directional gap
80 Restraining member
81 Holding plate portion
82 Supporting rod portion
90 Gap

The invention claimed is:

1. A sealing device for suppressing a leakage flow of a fluid via an annular gap between a stationary member and a rotary member of a rotary machine, the sealing device comprising:
a support fin having an annular shape; and
a movable fin having an annular shape and being disposed adjacent to the support fin in an axial direction,
wherein the movable fin comprises:
a fixing region disposed on a root-end side of the movable fin and fixed to the support fin; and a tip region including a tip of the movable fin and configured to be movable with respect to the support fin, wherein the movable fin has a thermal expansion coefficient that is greater than a thermal expansion coefficient of the support fin, and wherein, when the rotary machine is stopped, the tip of the movable fin is not radially inward of the support fins, and when the rotary machine is operating and the temperature of the seal device is elevated, the tip of the movable fin moves radially inward of the support fin due to the greater thermal expansion coefficient of the movable fin.

2. The sealing device according to claim 1, wherein the movable fin is attached to the support fin only in the fixing region on the root-end side of the movable fin.

3. The sealing device according to claim 1, wherein the movable fin includes a plurality of segments arranged in a circumferential direction.

4. The sealing device according to claim 3, wherein each of the segments forms part of the root-end side of the movable fin and the fixing region is a partial portion of a circumferential-directional range on the root-end side, and wherein each of the segments of the movable fin is allowed to expand thermally in a radial direction and the circumferential direction starting from the fixing region.

5. The sealing device according to claim 4, wherein the fixing region is positioned in a center, with respect to the circumferential direction, of the circumferential-directional range on the root-end side of each of the segments.

6. The sealing device according to claim 1, wherein the sealing device is capable of use in a rotary machine which $H_{m1} \geq H_{f1}$ and $H_{m2} < H_{f2}$ are satisfied, provided that, $H_{m1}$ is a clearance formed between the stationary member or the rotary member and the movable fin when the rotary machine is stopped, $H_{f1}$ is a clearance formed between the stationary member or the rotary member and the support fin when the rotary machine is stopped, $H_{m2}$ is a clearance formed between the stationary member or the rotary member and the movable fin when the rotary machine is in rated operation, and $H_{f2}$ is a clearance formed between the stationary member or the rotary member and the support fin when the rotary machine is in rated operation.

7. The sealing device according to claim 1, wherein the movable fin is disposed on a high-pressure side of the support fin.

8. The sealing device according to claim 7, further comprising a seal ring configured to be engaged with a groove formed on the stationary member or the rotary member, the seal ring having, on a tip-end side, a plurality of the support fins arranged in the axial direction, wherein the movable fin is disposed at least on the high-pressure side of the support fin positioned most upstream with respect to the leakage flow.

9. The sealing device according to claim 7, wherein a gap is formed between a tip portion of the movable fin and a tip portion of the support fin.

10. The sealing device according to claim 1, further comprising a seal ring configured to be engaged with a groove formed on one of the stationary member or the rotary member, the seal ring being connected to, on a tip-end side, the support fin, wherein the movable fin extends obliquely with respect to a radial direction from a root portion of the movable fin positioned in an axial-directional range of the groove toward a tip portion of the movable fin positioned outside the axial-directional range of the groove.

11. The sealing device according to claim 1, wherein the support fin and the movable fin are curved in a cross section, taken in the axial direction, of the rotary machine.

12. The sealing device according to claim 11, wherein the sealing device satisfies a relational expression $\theta_{f1} > \theta_{f2}$, provided that, $\theta_{f1}$ is an angle formed between a radial direction at the root-end side of the support fin and a tangent direction, in the cross section taken in the axial direction, of a surface of the support fin which is on a side adjacent to the movable fin, and $\theta_{f2}$ is an angle formed between the tangent direction and the radial direction at a tip-end side of the support fin, and wherein the movable fin is curved along the support fin.

13. A rotary machine comprising:

a stationary member;

a rotary member disposed so as to face the stationary member; and the sealing device according to claim 1 disposed in an annular gap between the stationary member and the rotary member.

* * * * *